United States Patent [19]

Roberts et al.

[11] Patent Number: 4,756,153
[45] Date of Patent: Jul. 12, 1988

[54] LOAD TRANSFER STRUCTURE

[75] Inventors: Derek A. Roberts, Bristol; Ronald Catlow, Derby, both of England

[73] Assignee: Rolls-Royce plc, London, England

[21] Appl. No.: 49,592

[22] Filed: May 14, 1987

[30] Foreign Application Priority Data

Jul. 2, 1986 [GB] United Kingdom ................ 8616151

[51] Int. Cl.⁴ .............................................. F02C 3/04
[52] U.S. Cl. ................... 60/39.161; 60/39.162;
  60/39.32; 60/226.1; 415/137; 415/138; 415/139
[58] Field of Search .................. 60/226.1, 39.162, 262,
  60/268, 39.32, 39.31, 39.161; 415/137, 138, 139,
  136, 142; 138/112, 113; 285/133.1

[56] References Cited

U.S. PATENT DOCUMENTS

| | | | |
|---|---|---|---|
| 3,363,416 | 1/1968 | Heybyrne | 60/39.32 |
| 3,494,129 | 2/1970 | Krebs | 60/226.1 |
| 3,720,060 | 3/1973 | Davies et al. | 60/226.1 |
| 3,830,058 | 8/1974 | Ainsworth | 60/226.1 |
| 3,915,521 | 10/1975 | Young | 60/226.1 |

FOREIGN PATENT DOCUMENTS

| | | | |
|---|---|---|---|
| 1239889 | 5/1967 | Fed. Rep. of Germany | 60/39.32 |
| 1075063 | 10/1954 | France | 60/39.32 |
| 257532 | 10/1948 | Switzerland | 415/137 |
| 2083558 | 3/1982 | United Kingdom | 60/226.1 |

*Primary Examiner*—Donald E. Stout
*Attorney, Agent, or Firm*—Cushman, Darby and Cushman

[57] ABSTRACT

A load transference structure between a core engine and power turbine comprises a plurality of circumferentially spaced apart radially extending spoke members, each of which is attached at its radially inner extent to first and second axially spaced apart support panels. Each of the spoke members is provided with a circumferentially extending portion positioned adjacent the panels which are adapted to cooperate with a circumferentially adjacent spoke member in such a manner that radial but not circumferential load transfer is permitted to take place between them. The load transfer structure permits load transfer to take place between the core engine casing and the power turbine.

12 Claims, 3 Drawing Sheets

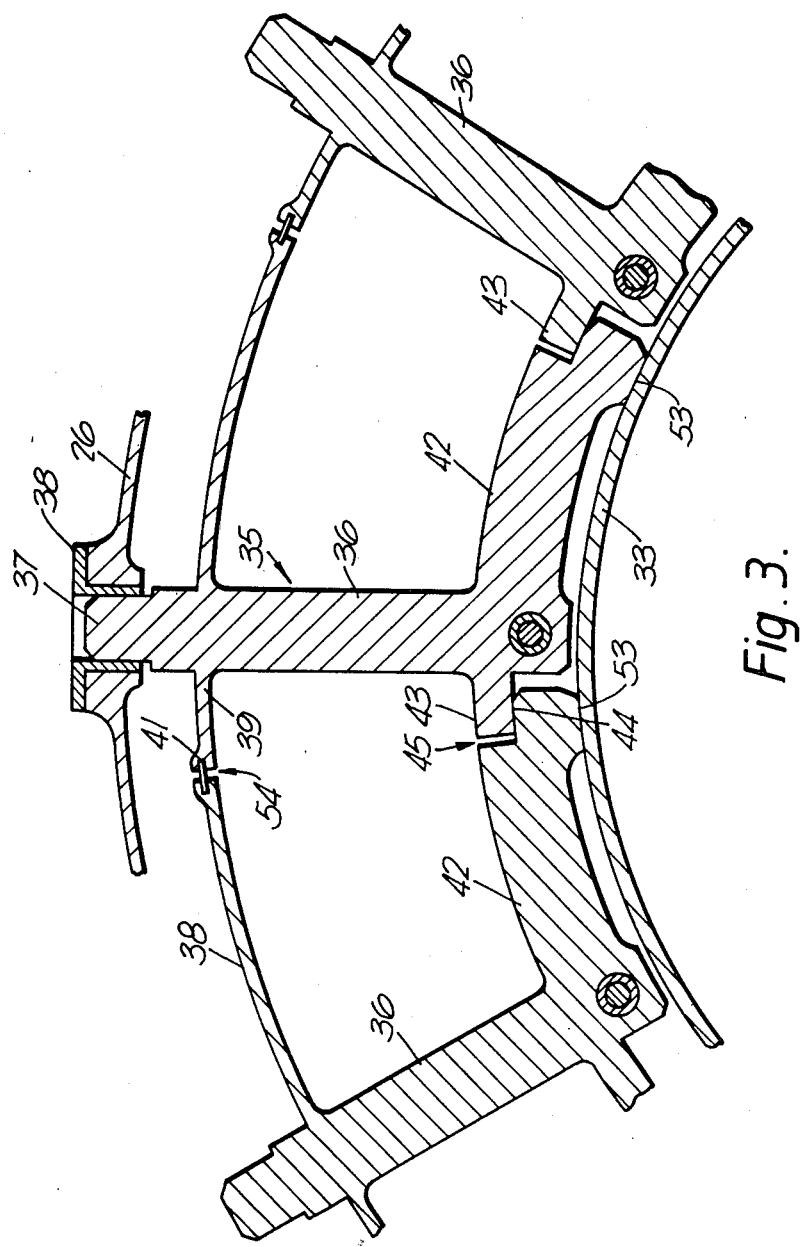

LOAD TRANSFER STRUCTURE

This invention relates to a load transfer structure and in particular to a load transfer structure suitable for a gas turbine engine.

One particular form of gas turbine engine for aircraft propulsion comprises a conventioal gas turbine core engine having a power turbine located at its downstream end, which power turbine is adapted to drive one or more sets of aerofoil fan propulsion blades. If the aerofoil propulsion blades are directly attached to the radially outer extents of arrays of turbine blades in their power turbine, then they and the cowling which conventionally surrounds them are necessarily located at the downstream end of the engine. With this type of arrangement it is necessary to locate the structure by means of which the engine is mounted on an aircraft in the vicinity of the power turbine. As a result of this the core engine is not directly attached to the aircraft, but is instead attached to the power turbine.

The main support structure within the power turbine from which the core engine must be mounted is located radially inwardly of the gas path through the power turbine. However the core engine is usually mounted from the downstream end of its external casing so that the load transfer structure interconnecting the core engine and the power turbine must pass through the hot gas flow which is exhausted in operation from the core engine into the power turbine.

It is an object of the present invention to provide such a load transfer structure between the core engine and power turbine which is minimally affected by the thermal gradient resulting from the aforementioned hot gas flow.

According to the present invention a structure for load transference between first and second generally circular, coaxial, radially spaced apart members comprises a plurality of circumferentially spaced apart, radially extending spoke members interconnecting said first and second members, each spoke member being attached to said first member in such a manner that substantially only relative radial movement is permitted between them and fixedly attached to said second member at at least two axially aligned, axially spaced apart locations, each of said spoke members being provided with a circumferentially extending portion positioned adjacent said second member and adapted to cooperate with a circumferentially adjacent spoke member in such a manner that radial but not circumferential load transfer is permitted to take place between each spoke member and the circumferentially extending portion of its adjacent spoke member.

The invention will now be described, by way of example, with reference to the accompanying drawings in which:

FIG. 3 is a view on section line A—A of FIG. 2.

Figure 1:
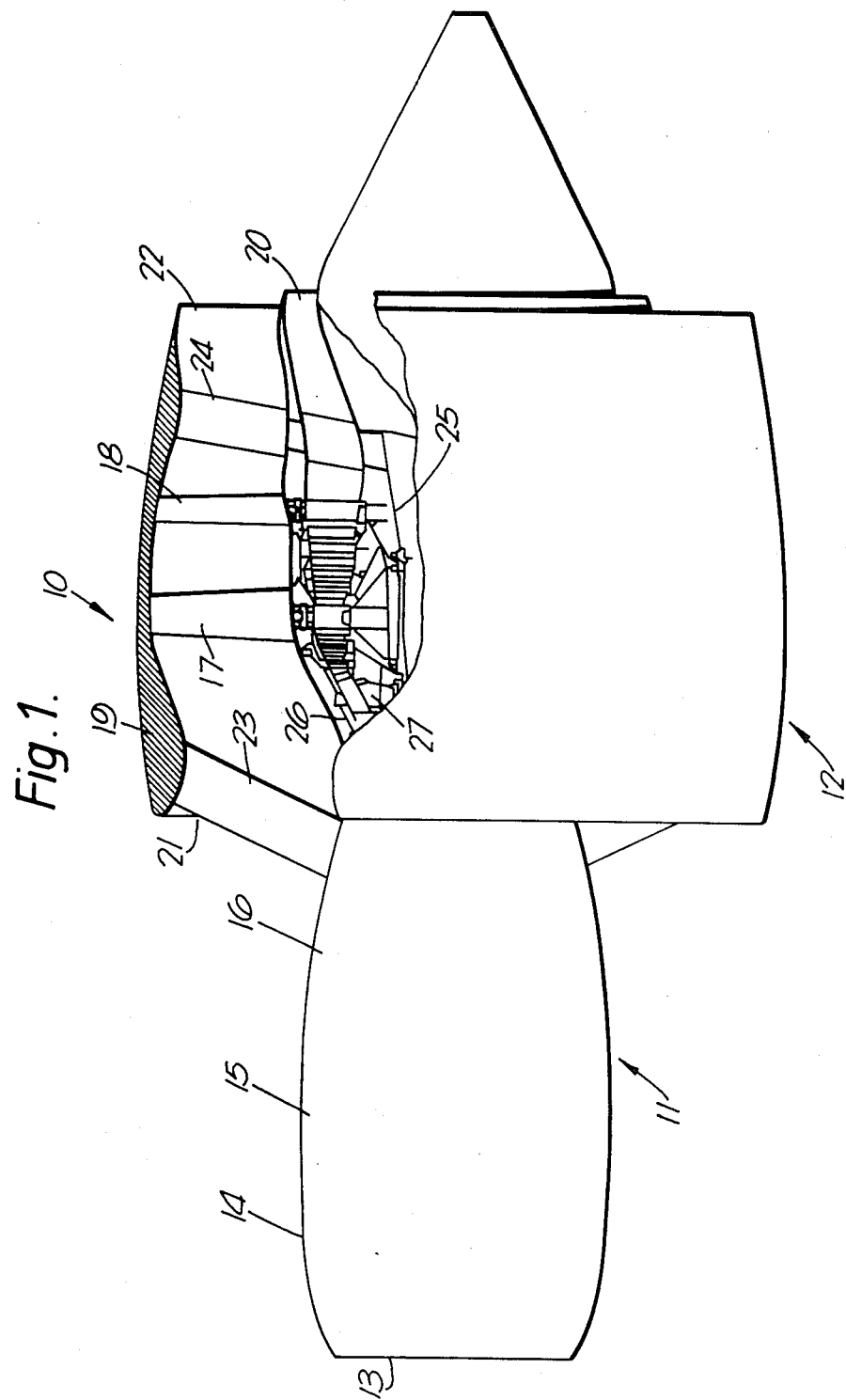
FIG. 1 is a partly sectioned side view of a ducted fan gas turbine propulsion engine incorporating a load transfer structure in accordance with the present invention.

With reference to FIG. 1 a ducted fan gas turbine engine generally indicated at 10 comprises a core engine 11 having a power turbine 12 located at its downstream end. The core engine 11 is of conventional construction in that it comprises an air intake 13, a compressor section 14, combustion equipment 15 and a turbine 16. The core engine 11 functions in the conventional manner whereby air taken in through the intake 13 is compressed by the compressor section 14 before being mixed with fuel and the mixture combusted in the combustion equipment 15 whereupon the resultant combustion products expand through the turbine 16 before being exhausted into the power turbine 12.

The power turbine 12 is not of conventional construction in that it comprises a number of stages of contra-rotating turbine blades, two stages of which have fan blades 17 and 18 respectively attached to their radially outer extents. The fan blades 17 and 18 contra-rotate and are enclosed by a fan cowling 19.

In operation hot gases exhausted from the core engine 11 are directed into the power turbine 12 to provide contra-rotation of the turbine blades thereof and in turn contra-rotation of the aerofoil propulsion blades 17 and 18. A certain amount of propulsive thrust is provided by the gases exhausted from the power turbine 12 through the annular outlet duct 20. However the majority of the propulsive thrust of the gas turbine engine 10 is provided by air which has been drawn in at the upstream end 21 of the fan duct 19 and accelerated by the contra-rotating aerofoil propulsion blades 17 and 18 before being exhausted from the downstream end 22 of the fan cowling 19.

The fan cowling 19 and the core engine 11 are interconnected by a plurality of generally radially extending forward struts 23 while a plurality of generally radially extending rearward struts 24 interconnect the fan cowling 19 with the remainder of the power turbine 12. The rearward struts 24 provide the majority of the load transfer between the engine 10 and the aircraft on which it is in operation mounted and are attached at their radially inner ends to the axially downstream end of a generally cylindrical support member 25 within the power turbine 12. The cylindrical support member 25 carries all of the contra-rotating elements of the power turbine 12 and is attached at its upstream end to the downstream end of the casing 26 of the core engine 11 by means of a load transfer structure generally indicated at 27 and which can be seen in more detail in FIG. 2.

Figure 2:
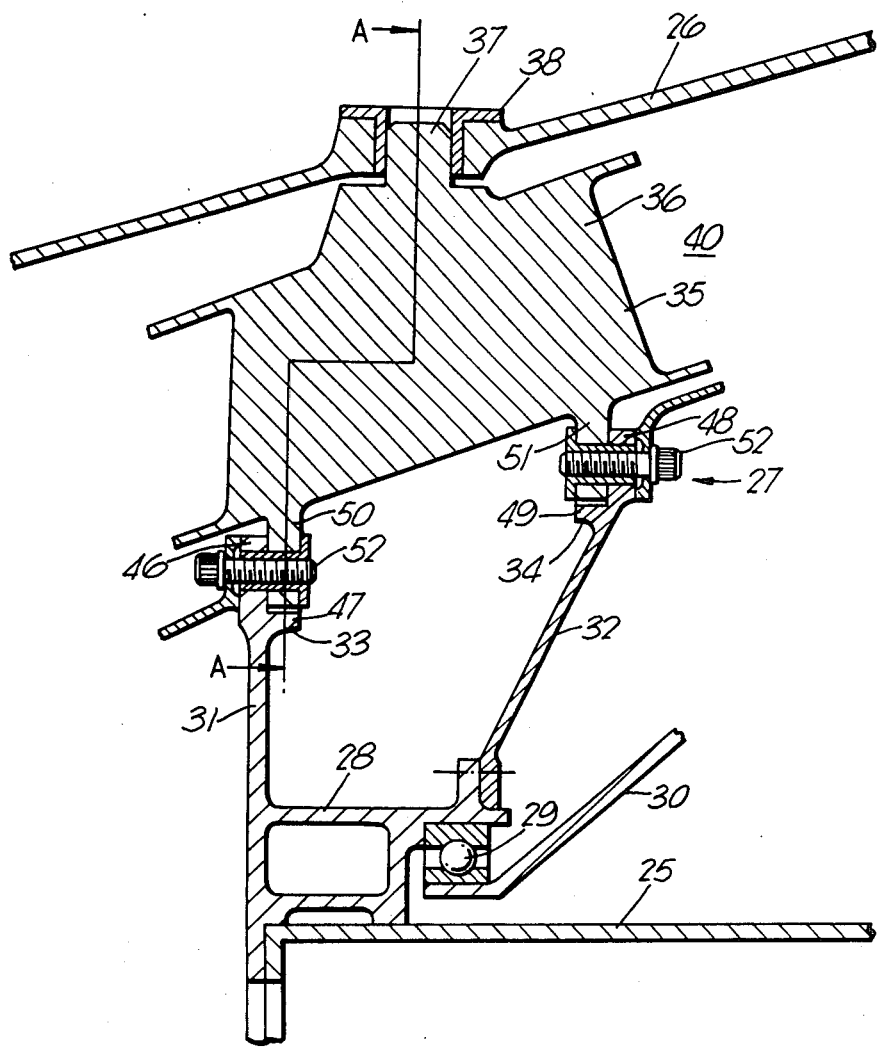
FIG. 2 is a sectioned side view of a portion of a load transfer structure in accordance with the present invention.

Referring to FIG. 2 the load transfer structure 27 comprises an annular bearing housing 28 which carries a bearing 29 supporting the upstream end 30 of a rotational portion of the power turbine 12. The bearing housing 28 is fixedly attached to the upstream end of the cylindrical support member 25 and is provided with a radially extending annular panel 31 at its upstream end and a generally frusto-conical panel 32 at its downstream end. The panels 31 and 32 are respectively provided with rims 33 and 34 which support the radially inner extents of a plurality of spoke members 35 which extend radially across the gas passage 40 interconnecting the core engine 11 with the power turbine 12.

Each spoke member 35 has a centre portion 36 of aerodynamic form to provide minimal disturbance to the gas flow between the core engine 11 and the power turbine 12 and is provided at its radially outer extent with a circular cross section spigot 37 which locates in a correspondingly shaped bush 38 provided in the core engine casing 26. It will be appreciated, however, that alternative forms of connection could be employed between the spoke members 35 and the core engine casing 26 as long as relative radial movement is permitted without relative axial movement.

The spoke members 35 are circumferentially spaced apart as can be seen in FIG. 3 and each is provided at its radially outer extent with circumferentially extending platforms 39A and 39B which cooperate to define a portion of the radially outer extent of the gas passage 40 containing the spoke members 35. The edges of the platforms 39A and 39B are separated by a circumferential gap 54 to permit the thermal growth of the platforms 39A and 39B. Seals 41 of conventional construction which accommodate this thermal growth are provided between adjacent platforms 39A and 39B.

The radially inner extent of the gas passage 40 is defined by a plurality of circumferentially extending platforms 42 and 43; each spoke member 35 having one of each of the circumferentially extending platforms 42 and 43 provided on its radially inner extent. The circumferentially extending platforms 42 are of greater circumferential extend than the circumferentially extending platforms 43 and are each provided with a stepped portion 44 to engage its adjacent platform 43 in such a manner that radial but not circumferential load transfer may take place between them. A circumferential gap 45 is thus defined between adjacent platforms 42 and 43 to permit relative circumferential movement therebetween.

The rim 33 provided on the radially outer extent of the annular panel 31 is, as can be seen in FIG. 2, of substantially L cross-sectional shape so as to define a radially extending apertured flange 46 and an axially extending support surface 47. The rim 34 on the radially outer extent of the frusto conical panel 32 is of similar L cross-sectional shape to define a radially extending apertured flange 48 and axially extending support surface 49. Each of the spoke members 35 is provided at its radially inner extent with apertured lugs 50 and 51 which locate on the rims 33 and 34 respectively. The lugs and flanges 50 and 46, and 51 and 48 are fixedly attached to each other by hollow bolted dowels 52. The dowels 52 are, as can be seen in FIG. 3, aligned with the centre portions 36 of the spoke members 35 and are in axial alignment with each other.

Each of the circumferentially extending radially inner platforms 42 is radially spaced apart from the axially extending support surfaces 47 and 49 provided on the rims 33 and 34 respectively with the exception of that portion 53 which is radially inward of the adjacent platform 43 with which it cooperates.

In operation exhaust gases exhausted from the core engine 11 and at very high temperature pass over the spoke members 35, thereby creating large temperature differences, which can be as high as 500° C., between the various parts of the load transfer structure 27. In particular the spoke members 35 thermally expand at a greater rate than the rims 33 and 34 on which they are mounted. This difference in thermal expansion results in a variation in the circumferential gaps 45 and 54 but does not result in the spoke members 35 departing from their equi-angularly spaced apart relationship. Likewise radial expansion of the load transfer structure 27 results in relative radial movement between each spigot 37 and the bush 38 in which it is located thereby ensuring that radial loading is not imposed upon the core engine casing 26. However the cooperation of the spigot 37 and the bush 38 ensures that the cylindrical support member 25 and the core engine casing 26 are maintained by the load transfer structure 27 in coaxial relationship.

Although the present invention has been described with reference to a gas turbine engine provided with a ducted fan, it will be appreciated that it is equally applicable to other forms of gas turbine engine such as, for instance, are provided with aerofoil propulsion blades with are not ducted.

We claim:

1. A structure for load transference between first and second generally circular, coaxial, radially spaced apart members comprising a plurality of circumferentially spaced apart, radially extending spoke members interconnecting said first and second members, each spoke member being attached to said first member in such a manner that substantially only relative radial movement is permitted between them and fixedly attached to said second member at at least two axially aligned, axially spaced apart locations, each of said spoke members being provided with a circumferentially extending portion positioned adjacent said second member and adapted to cooperate with a circumferentially adjacent spoke member in such a manner that radial but not circumferential load transfer is permitted to take place between each spoke member and the circumferentially extending portion of its adjacent spoke member.

2. A structure for load transference as claimed in claim 1 wherein said first and second members comprise portions of a core engine and power turbine of the gas turbine engine, said core engine and power turbine being interconnected by an annular gas passage, said spoke members extending radially across said annular gas passage interconnecting said core engine and power turbine.

3. A structure for load transference as claimed in claim 2 wherein said core engine has an outer casing which comprises said core engine portion to which said spoke members are attached, the radially outer extent of each of said spoke members being attached to said outer casing.

4. A structure for load transference as claimed in claim 3 wherein each of said spoke members is provided with a radially extending spigot at its radial outer extent which spigot is in radially sliding engagement within a corresponding bush provided in said core engine casing.

5. A structure for load transference as claimed in claim 3 wherein each of said spoke members is provided at its radially outer extent with circumferentially extending platform portions, the circumferential extents of platform portions of adjcent spoke members cooperating in sealing engagement so that said platform portions define a portion of the radially outer extent of said annular gas passage interconnecting said core engine and power turbine.

6. A structure for load transference as claimed in claim 2 wherein the radially inner extent of each of said spoke members is attached to said power turbine portion.

7. A structure for load transference as claimed in claim 6 wherein said power turbine portion comprises two axially spaced apart annular panel members, each defining a rim portion to which the radially inner extents of each of said spoke members are fixedly attached at said axially aligned axially spaced apart locations.

8. A structure for load transference as claimed in claim 7 wherein at least one of said panel members is frusto-conical in form.

9. A structure for load transference as claimed in claim 7 wherein each of said rim portions comprises a radially extending flange and an axially extending support surface, the radially inner extent of each of said spoke members at the junction with said circumferentially extending portions thereof being fixedly attached to said flange and radially spaced apart from said axially extending support surface, the free ends of each of said circumferentially extending spoke member portions locating on said axially extending support surface.

10. A structure for load transference as claimed in claim 9 wherein the free ends of each of said circumferentially extending spoke member portions are engaged radially by a correspondingly shaped feature provided on the radially inner extent of the adjacent spoke member.

11. A structure for load transference as claimed in claim 10 wherein said circumferentially extending spoke member portions constitute a portion of the radially inner extent of said gas passage.

12. A structure for load transference as claimed in claim 2 wherein said second member additionally provides support for a bearing within said power turbine.

* * * * *